Sept. 24, 1940.  W. M. HAHNEMANN ET AL  2,215,786
SYSTEM FOR LANDING AIRPLANES
Filed Nov. 19, 1937
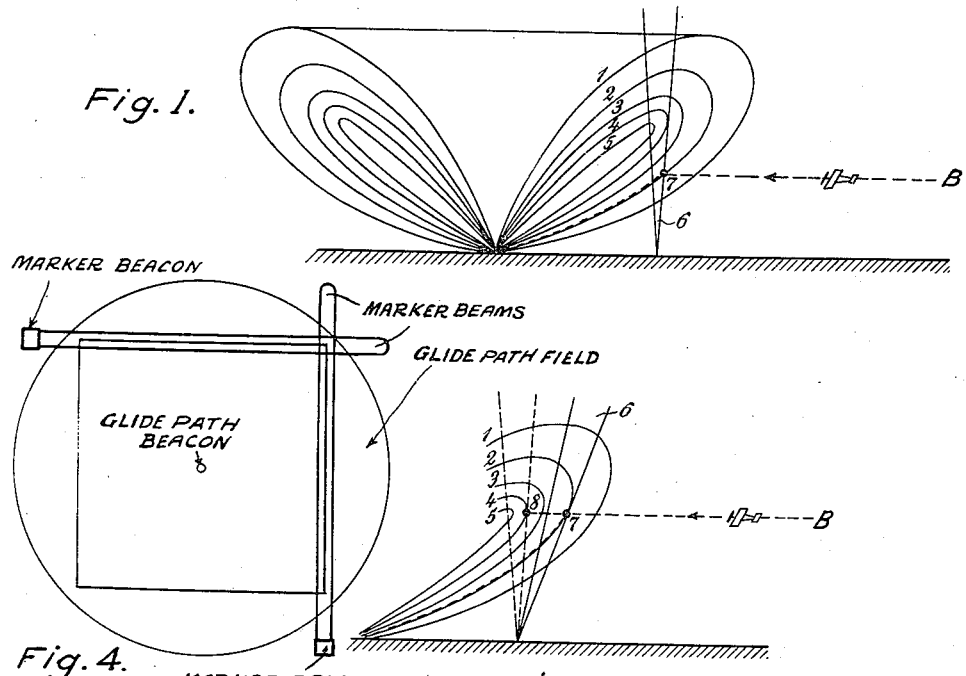
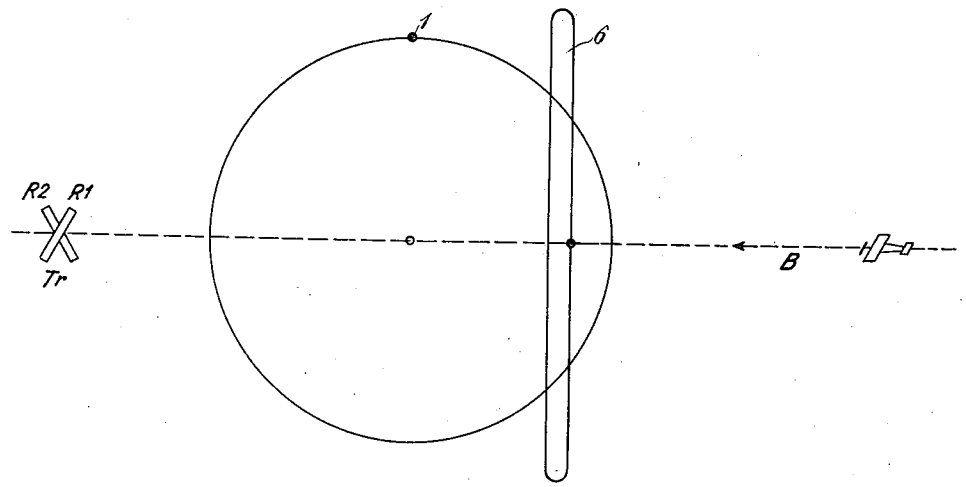
Inventors:
Walter Max Hahnemann
Ernst Kramar
by R. C. Hopgood
Attorney Patented Sept. 24, 1940

2,215,786

UNITED STATES PATENT OFFICE 2,215,786

SYSTEM FOR LANDING AIRPLANES

Walter Max Hahnemann, Berlin-Marienfelde, and Ernst Kramar, Berlin-Tempelhof, Germany, assignors to C. Lorenz Aktiengesellschaft, Berlin-Tempelhof, Germany, a company Application November 19, 1937, Serial No. 175,429
In Germany May 10, 1933

5 Claims. (Cl. 250—11)

The present application is a continuation in part of our copending U. S. patent application Ser. No. 722,470, filed on April 26, 1934, for System for landing airplanes, and relates to an improvement upon such arrangements.

It is well known for the purpose of facilitating the landing of airplanes to employ so-called slip-way beacons which radiate a torus-shaped bundle of ultra-short electromagnetic waves at a certain angle to the ground surface. In this type of transmitters, the radiation in the horizontal plane is equally transmitted into all directions, while in the vertical plane being produced with an upwardly directed inclination, so as to create a torus-shaped radiation diagram. Upon landing, the airplane descends on a curve of constant field intensity. In order to reliably realize this method, it has hitherto been necessary to ensure that the transmitter maintains its power continuously constant, and that the receiver always has the same sensitivity. This requirement may relatively easily be fulfilled on the transmitter side, by preferably supervising not only the transmitter, but even the field of the transmitter. On the receiving side, however, considerable difficulty is experienced, as the sensitivity of the receiver must remain the same over a long period of time. To give an example in a Berlin to London flight, the receiver which has to be adjusted in Berlin must maintain a constant sensitivity until landing in London, which will take place several hours later. It will, of course, be possible to disconnect the receiver during the journey, but upon re-insertion before the actual landing in London it must have the same sensitivity. It will easily be seen that this is not easy to do on account of the extraordinarily high sensitivity of modern receivers.

According to the invention, it is proposed to carry out this slip-way beacon method in such a way that the beginning of the landing is indicated by an additional signal indication, and that the indication of field intensity which exists at the moment of the reception of the additional signal indication is employed to determine the actual landing path.

The invention will be more readily understood from a consideration of the following description taken in conjunction with the accompanying drawing in which:—

Figs. 1 and 2 each show an elevation of a landing ground, while

Fig. 3 shows a plan of a landing ground.

Fig. 4 shows a modified plan view of a landing field wherein a plurality of marker beacons are utilized.

Referring to the Figs. 1 and 2, the reference numerals 1 to 5 represent different surfaces of equal field intensity of a torus-shaped radiation diagram produced in any known manner. These toroidal surfaces of equal field intensity are utilized by the airplane for landing purposes, for defining the landing path in the vertical plane.

For indicating to the airplane the landing direction also in the horizontal plane, that is to say, to indicate the compass direction in which landing shall be effected, additional means may be necessary under certain circumstances. In such cases a further transmitter for instance, may be employed for intermittently producing two different and mutually intersecting radiation diagrams in the horizontal plane in order to indicate the guiding direction as that line or vertical plane along which the two intersecting diagrams have equal field intensity (the AN-method). For example, it has been proposed to employ a transmitting device which alternately feeds two crossed loop antennae from a high-frequency generator. However, the landing direction in the horizontal plane need not be indicated by virtue of a particular transmitting device, because it may be preferred to use directional receiving equipments located in the airplane itself. Said equipments, operating in accordance with the known direction finding principle, or using directional antennae alternately connected to the receiver, indicate the landing direction by way of comparison between the amplitudes of two receiving diagrams.

The method hitherto employed is based on the fact that the airplane, which in the first instance arrives horizontally on its guiding line B, remains on this course in the bundle of rays until it reaches the field intensity in which it must descend. As soon as a predetermined deflection of the indicating device of the receiver is reached, the aeroplane descends. However, as already explained in the foregoing, this requires a continuous constancy with respect to the sensitivity of the receiver.

According to the invention, the point at which the landing should be commenced is given by an additional signal indication 6 which, as shown in Fig. 1 is directed perpendicularly, or as shown in Fig. 2 obliquely upwards. This additional indication may either be given acoustically or by wireless. With the oblique direction it may be preferable to give it by wireless. The airplane flies on horizontally until it reaches point 7, at which it receives the indication 6. It then descends from point 7 so that the deflection of the indicating device remains the same as it was at the moment of the arrival of the signal indication 6. The actual degree of deflection of the indicating device is immaterial and it does not matter if the sensitivity of the receiver has altered since the commencement of the journey. The indicating device now fulfills the problem of ensuring during the short period of landing the descent on a curve of equal field intensity.

The oblique direction of the signal indication 6 shown in Fig. 2 has the advantage that an airplane whose horizontal track of flight B is higher than in Fig. 1 likewise descends on the field intensity curve 2 and not on the field intensity curve 4, for which point 8 indicates the beginning of the landing. For comparison, in Fig. 2 the perpendicular designation is indicated in dotted lines.

The Fig. 3 shows the method for determining the course line in the horizontal plane. Due to the fact that the radiation 1 of the slip-way beacon transmitter is equally distributed into all directions in the horizontal plane, the pilot without further indications cannot ascertain on which side of the torus-shaped radiation he should make his descent, i. e. which of the infinite number of landing paths on this surface should be followed. An additional transmitting equipment Tr is provided for this purpose and adapted to transmit a ray B intersecting the torus-shaped landing path radiation which is followed by the airplane on its course toward the airport. This guiding ray may be produced in any known manner, e. g. by keying two transversally arranged frame aerials R1 and R2 according to the AN-rhythm. The airplane starts its descent to the landing field at the point of intersection between the guiding ray B and the signal indication 2. The method of the present invention is not limited to the above mentioned guiding ray, as the course line may suitably be determined also by means of directional receiving devices located in the airplane and which are adapted to find the direction to a transmitter of the landing airport. The airplane itself may create transmission in order to ascertain its momentary position as well as the course line with respect to a direction finding system positioned on the ground.

The additional signal indication 6 may be given by means of devices which are in themselves well known, and known types of beacons used for indicating the landing ground boundaries are readily adaptable for the purpose. In the simplest case a parabolic reflector may be employed which concentrates a beam of electromagnetic rays perpendicularly or obliquely upwards. It will also be possible to employ transmitter arrangements, the radiation diagrams of which present a zone of zero intensity so that an indication of minimum receiving energy is obtained. The last mentioned arrangements comprise one vertical dipole, for example. In cases that the airplane overflies such an arrangement, the reception decays due to the fact that said arrangements operate with vertical polarization. The moment of decay is extraordinarily sharply defined and may therefore be used as indication. The above mentioned zones of minimum intensity may also be created by means of frame aerials having the well known double circular radiation characteristic.

Finally, instead of providing the signal indication with the shape of a bundle of rays, said indication may be given in the form of a plane as shown in Fig. 3 through which the airplane flies. An arrangement employing two transmitters located in diagonally opposing corners of the airport may be provided as illustrated in Fig. 4, wherein each transmitter radiates two such planar signal indications for two sides of said airport, respectively.

On operating with acoustical indication, the corresponding directional means for acoustical transmitters or acoustical transmitter combinations may be used.

What is claimed is:

1. The method of landing airplanes which comprises radiating a toroidal short wave field of electromagnetic energy at an angle to the ground, directing a planar radiation pattern upwardly to intersect said field at a point in space from which landing of the airplane should be commenced, and utilizing the indication on the airplane of the field intensity of said wave field which prevails at the moment of reception of said signal at said intersection as a reference level with which to compare the field intensities subsequently encountered in landing the airplane within said short wave field.

2. The method of landing airplanes according to claim 1, wherein the upwardly directed radiations are constituted by sound waves.

3. The method of landing airplanes which comprises radiating a toroidal short wave field of electromagnetic energy at an angle to the ground, directing a plurality of planar radiation patterns upwardly to intersect said toroidal field to define a plurality of sides and to indicate points in space from which landing of the airplane should be commenced, and utilizing the indication on the airplane of the field intensity of said wave field which prevails at the moment of reception of said signal at said intersection as a reference level with which to compare the field intensities subsequently encountered in landing the airplane within said short wave field.

4. A landing system comprising means for radiating a toroidal short wave field and means for producing a plurality of planar radiation patterns in a plurality of planes about the circumference of said toroidal field.

5. A system according to claim 4, wherein said means for radiating a plurality of planar patterns comprises two radiating transmitters disposed at the diagonally opposite corners of a square around the toroidal field and each adapted to radiate two planar patterns along the sides of said square.

WALTER MAX HAHNEMANN.
ERNST KRAMAR.